United States Patent
Narayanan et al.

(10) Patent No.: US 9,418,064 B1
(45) Date of Patent: Aug. 16, 2016

(54) RESOURCE QUEUES

(75) Inventors: Sivaramakrishnan Narayanan, Sunnyvale, CA (US); Florian Michael Waas, San Francisco, CA (US); Joy Jie Kent, Belmont, CA (US)

(73) Assignee: EMC Corporation, Hopkinton, MA (US)

( * ) Notice: Subject to any disclaimer, the term of this patent is extended or adjusted under 35 U.S.C. 154(b) by 981 days.

(21) Appl. No.: 13/051,980

(22) Filed: Mar. 18, 2011

(51) Int. Cl.
*G06F 17/30* (2006.01)
*G06F 15/173* (2006.01)

(52) U.S. Cl.
CPC .............. *G06F 17/30* (2013.01); *G06F 15/173* (2013.01)

(58) Field of Classification Search
USPC ............ 707/705–772; 718/102–105; 709/200
See application file for complete search history.

(56) References Cited

U.S. PATENT DOCUMENTS

| | | | | |
|---|---|---|---|---|
| 5,544,318 | A * | 8/1996 | Schmitz et al. | 709/207 |
| 7,933,205 | B1 * | 4/2011 | Shaw | H04L 41/12 370/235 |
| 2002/0078028 | A1 * | 6/2002 | Lisanke | G06F 9/5027 |
| 2005/0027788 | A1 * | 2/2005 | Koopmans | H04L 67/32 709/200 |
| 2009/0077233 | A1 * | 3/2009 | Kurebayashi | G06F 9/4843 709/224 |
| 2010/0274893 | A1 * | 10/2010 | Abdelal | H04L 29/0602 709/224 |
| 2011/0154355 | A1 * | 6/2011 | Becker et al. | 718/104 |
| 2012/0215764 | A1 * | 8/2012 | Barsness | G06F 17/30864 707/720 |

* cited by examiner

*Primary Examiner* — Hosain Alam
*Assistant Examiner* — Tuan-Khanh Phan
(74) *Attorney, Agent, or Firm* — Barry N. Young

(57) ABSTRACT

A method, article of manufacture, and apparatus for processing queries, comprising receiving a query, determining a query classification for the query, assigning the query to a resource queue based on the determined query classification, and placing the query in the assigned resource queue. In some embodiments, the resource queue is divided into a plurality of slots, and the query is placed in a slot. The resource queue may be associated with a resource queue memory allocation, and each of the plurality of slots is associated with a slot memory allocation.

12 Claims, 6 Drawing Sheets

RESOURCE QUEUES

CROSS REFERENCE TO RELATED APPLICATIONS

This application is related to co-pending U.S. patent application Ser. No. 13/051,986 for MEMORY QUOTA and filed concurrently herewith on Mar. 18, 2010, which is incorporated herein by reference for all purposes, and to co-pending U.S. patent application Ser. No. 13/051,995 for DYNAMIC ALLOCATION OF MEMORY FOR MEMORY INTENSIVE OPERATORS and filed concurrently herewith on Mar. 18, 2010, which is incorporated herein by reference for all purposes.

FIELD OF THE INVENTION

This invention relates generally to databases, and more particularly to systems and methods for allocating memory in databases.

BACKGROUND OF THE INVENTION

Databases are typically used to organize, store, and retrieve data. Recent advances in technology have allowed databases to store vast amounts of data. However, querying vast amounts of data presents many challenges.

Due to the large amount of data stored, a database query may potentially take significant system resources, such as processing power and memory. One common error when performing a query on a large database is an "Out of memory" error. This error occurs when the system has run out of physical memory to perform an operation or operations.

Conventional methods to guard against an "Out of memory" error include adding more physical memory, or reducing the amount of queries processed concurrently. However, conventional methods are either expensive, not scalable, or both. There is a need, therefore, for an improved method, article of manufacture, and apparatus for allocating memory in databases.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
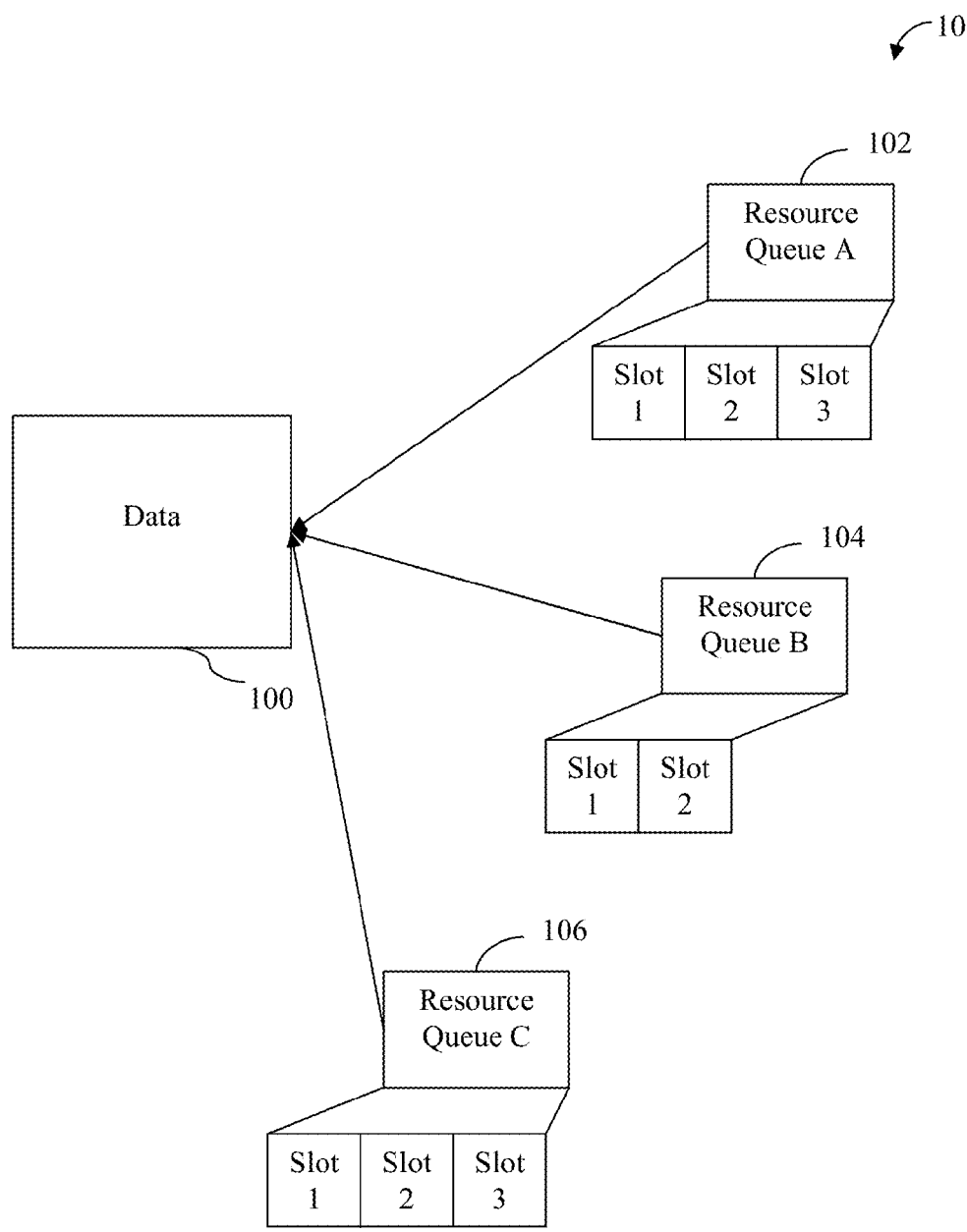
FIG. 1 is a diagram of a database in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Databases typically handle many queries simultaneously. For example, an airline database may handle queries from thousands of users simultaneously via the internet. Handling too many queries concurrently may lead to out of memory errors. If too many users submit queries concurrently, and the database processes those queries simultaneously, the database will run out of memory and the queries will not be completed. Another cause may be a malicious user generating queries with an intent to overload the database, or prevent others from using the database. Conventional databases do not differentiate between queries. In conventional databases, a query is just as valid as another. There is no precedence give to one query over another query, or more system resources given to one query than another query.

The enhanced techniques described herein differentiate queries by placing queries in a resource queue. In some embodiments, a resource queue may include a total memory allocation and a cap on concurrent queries, among others. Queries coming from different types of users may be placed in different resource queues. To illustrate, suppose a company has a single database servicing three departments: Legal, Engineering, and Finance. It may be preferable to create three resource queues: One for legal, one for engineering, and one for finance. Depending on policy, the three resource queues may have dramatically different characteristics. If engineering had top priority, legal middle priority, and finance low priority, the engineering resource queue may have a total memory allocation of 1 GB, the legal resource queue may have 500 MB, and the finance resource queue may have 100 MB. Further, the engineering resource queue may be allowed five concurrent queries, while the legal and finance resource queries may be allowed two queries each. In this way, queries from engineering have a higher preference. Engineering queries are allocated more system resources so they are completed faster, and they are given more concurrent queries so more of them can be completed concurrently.

Other applications of the resource query may include placing queries from "platinum customers" into a platinum customer resource queue, which may have more system resources than a "gold customers" resource queue.

The memory allocation of a resource queue may be user-defined. For example, a system administrator may decide that the engineering resource queue is allocated 1 GB of memory. However, there may be times that the system administrator underestimates, or otherwise allocates an insufficient amount of memory for a resource queue. In such cases, the query may spill over to disk after it has used up all of its allocated memory.

FIG. 1 illustrates an example of resource queues in accordance with some embodiments. Database 10 includes Data 100, Resource Queue A 102, Resource Queue B 104, and Resource Queue C 106. As illustrated in FIG. 1, Resource Queue A has three slots, Resource Queue B has two slots, and Resource Queue C has three slots. Since Resource Queue A has three slots, up to three queries may be run concurrently on Resource Queue A. Similarly, since Resource Queue B has two slots, up to two queries may be run concurrently.

Figure 5:
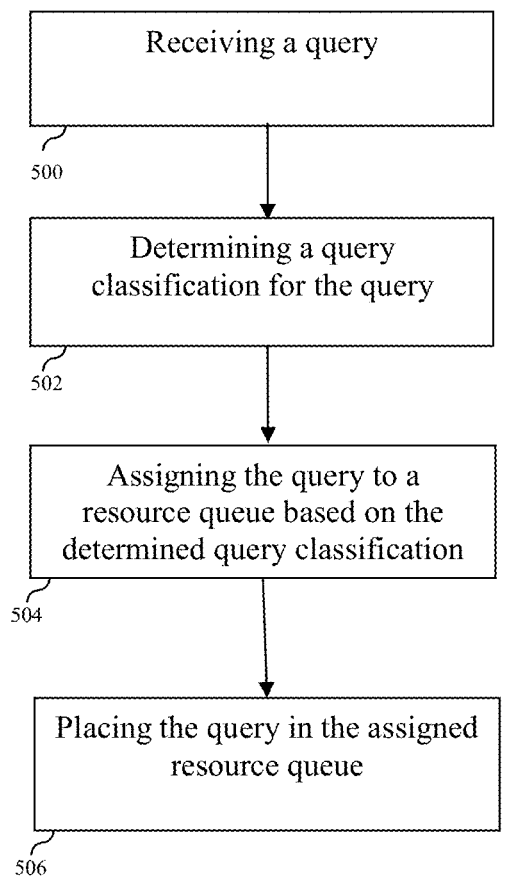
FIG. 5 is a flowchart of a method to process queries in accordance with some embodiments.

FIG. 5 illustrates a method to process queries in accordance with some embodiments. In step 500, a query is received. In step 502, a classification for the query is determined. In step 504, the query is assigned a resource queue based on the determined query classification. In step 506, the query is placed in the assigned resource queue.

The actual amount of concurrent queries may be limited by factors other than available slots, such as the amount of available memory. For example, suppose Resource Queue A is allotted 300 MB of memory total. In some embodiments, this may translate to 100 MB of memory per slot in Resource Queue A (300 MB/3 slots=100 MB/slot). However, if the first query takes more than 100 MB of memory, and the second query is allocated 100 MB, the third query would be allocated less than 100 MB of memory. If allowing a query to execute with less than 100 MB allocated may be unsafe (e.g. high probability of returning an out of memory error), the system or administrator may decide not to run a third concurrent query until one of the first two queries finishes.

Further, though FIG. 1 illustrates Resource Queue A and C having the same amount of slots, the amount of memory allocated to each query within each queue may be different. For example, suppose Resource Queue A was allocated a total amount of 300 MB, each of its queries may be allocated 100 MB. However, Resource Queue C may have been a more important resource queue (e.g. "platinum" level customers' queues may be placed in this resource queue), and was allocated a total of 900 MB. In this case, each of Resource Queue C's queries may be allocated 300 MB. In some embodiments, it may be preferable to assign different slots different amounts of memory (e.g. first slot 40% of the total, second slot 30% of the total, and third slot 30% of the total).

In some embodiments, a database optimizer may translate a query into an execution plan that includes a tree of operators. There may be several ways to execute a query, and the database optimizer may choose one of many execution plans based on policy or a cost model. A user, such as a system administrator, may inspect and influence an execution plan through several mechanisms. For example, the user may change certain parameters, such as the cost of scanning a table sequentially vs using an index for random access of the table.

A typical query tree may include many operators. Such operators include sort, hash join, filter, etc. Operators may be classified as memory intensive (MI) or non-memory intensive (NMI). Sequential Scan is a NMI operator. Sort, on the other hand, is a MI operator. This is especially true if the sort operator has to sort a large amount of data. In some embodiments, it may be beneficial to allocate different amounts of memory to different operators.

For example, in some embodiments, NMI operators may be assigned a pre-set memory allocation, while MI operators may be assigned a dynamic memory allocation. Since NMI operators require little memory to complete, their allocation may be set by a system administrator or some other user having sufficient authority. For example, in some embodiments, a system administrator may assign 1 MB to each NMI operator. It should be noted that a system administrator may also determine which operators are classified as NMI, and which operators are classified as MI.

Figure 4:
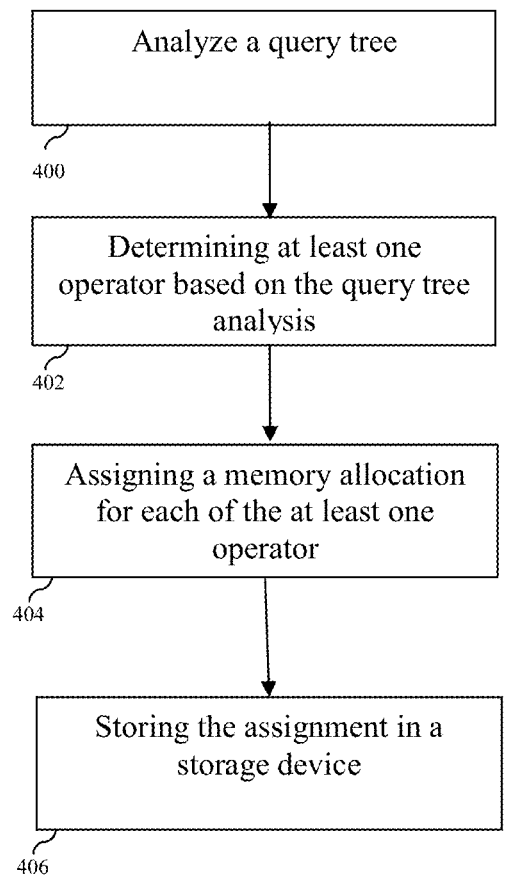
FIG. 4 is a flowchart of a method to process queries in accordance with some embodiments.

FIG. 4 illustrates a method to process queries in accordance with some embodiments. In step 400, a query tree is analyzed. In step 402, at least one operator is determined based on the query tree analysis. In step 404, a memory allocation is assigned for each of the at least one operator. In step 406, the assignment is stored in a storage device. In some embodiments, the assignment may be stored in a storage device, such as a physical hard disk, memory, a virtual hard disk, etc.

With the NMI operators' memory allocation set, it is now possible to determine how much memory the MI operators should be allocated. As discussed above, a resource queue may be allocated a specific amount of memory, and have a cap on the number of concurrent queries. Using the example above, if the engineering resource queue was allocated 1 GB of memory, and had a cap of five concurrent queries, then each query may be allocated roughly 200 MB each. This is assuming that each of the five concurrent engineering queries is given equal amounts of memory. It should be noted that the queries need not be given equal amounts of memory.

For ease of illustration, suppose 200 MB must be shared among all the operators in an engineering query. Suppose the query contained fifty NMI operators and three MI operators. If the system administrator allocated 1 MB per NMI operator, that would leave 150 MB for the three MI operators. Thus, each of the three MI operators may be allocated 50 MB. This is assuming that each of the three MI operators is given equal amounts of memory. It should be noted that the MI operators need not be given equal amounts of memory. For example, SORT may be given more memory over a hash-join.

In some embodiments, the following algorithm may be used to determine how much memory a MI operator should receive:

$$MI=(X-NMI*k2)/k1, \text{ where:}$$

MI=amount of memory allocated for each MI operator,
X=total amount of memory allocated for the query,
NMI=amount of memory allocated for each NMI operator,
k2=number of NMI operators in the query, and
k1=number of MI operators in the query.

Since X and NMI may be pre-set by a system administrator, and k2 and k1 are readily ascertainable by inspecting the execution plan in some embodiments, MI allocation may be calculated.

Figure 2:
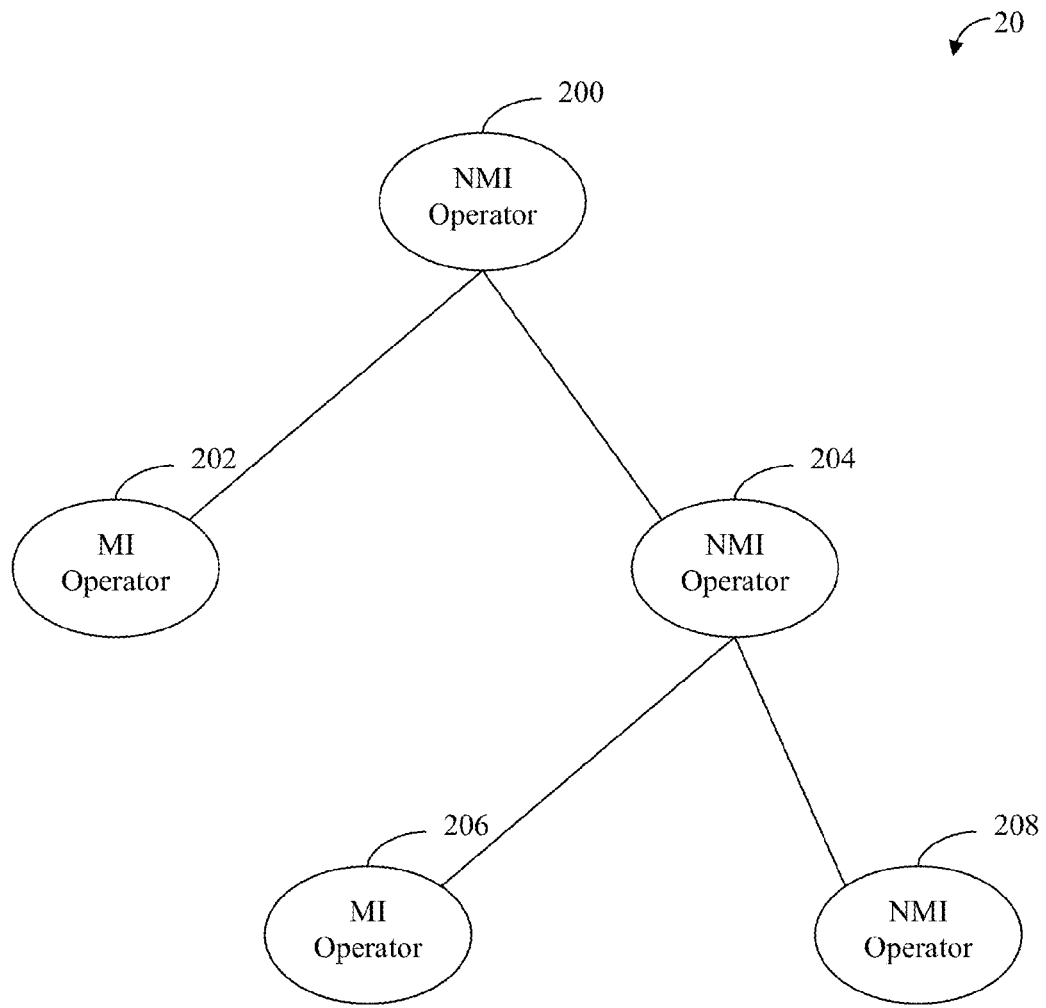
FIG. 2 is a diagram of a query tree in accordance with some embodiments.

FIG. 2 illustrates a query tree in accordance with some embodiments. Query Tree 20 includes NMI operators 200, 204 and 208, and MI operators 202 and 206. In FIG. 2, k2=3, and k1=2. Using the above equation, if a system administrator set NMI to 10 MB and X to 230 MB, MI can be calculated as (230−10*3)/2=200/2=100 MB. In some embodiments, the memory allocation information may be associated with each operator (e.g. NMI operator 200 may be associated with 10 MB, MI operator 202 may be associated with 100 MB, etc.). This memory allocation information may be stored as part of the execution plan in some embodiments.

In some cases, the MI calculated may be insufficient. For example, suppose the MI calculated was 50 MB, but the query ended up running out of memory and spilling to disk. In such cases, it may be preferable to raise X in order to accommodate the query and prevent it from spilling to disk. This may be accomplished by the system administrator, or the database itself can automatically adjust X for subsequent similar queries if a disk-spill is detected.

The above equation may be rearranged to solve for X. That is, in some embodiments:

$$X=MI*k1+NMI*k2, \text{ where:}$$

X=total amount of memory allocated for the query,
MI=amount of memory allocated for each MI operator,
NMI=amount of memory allocated for each NMI operator,
k2=number of NMI operators in the query, and
k1=number of MI operators in the query.

In some embodiments, X may be computed analytically using a linear equation. However, in some embodiments, X may not be a linear function of MI. Rather, X may be a nonlinear function that may be proportionate to $MI*k1+NMI*k2$. In some embodiments, it may be preferable to employ a binary search algorithm to find the optimal value of X. For example, the binary search algorithm may begin with a low, medium and high value X and compute MI's using the algorithm. Based on the 3 MIs and the target, the process is repeated with a smaller range of X. Thus, a desirable X may be calculated, and the resource query may be adjusted accordingly. For example, if X is calculated to be 100 MB larger than the original value, X may be increased for subsequent similar queries.

Figure 3:
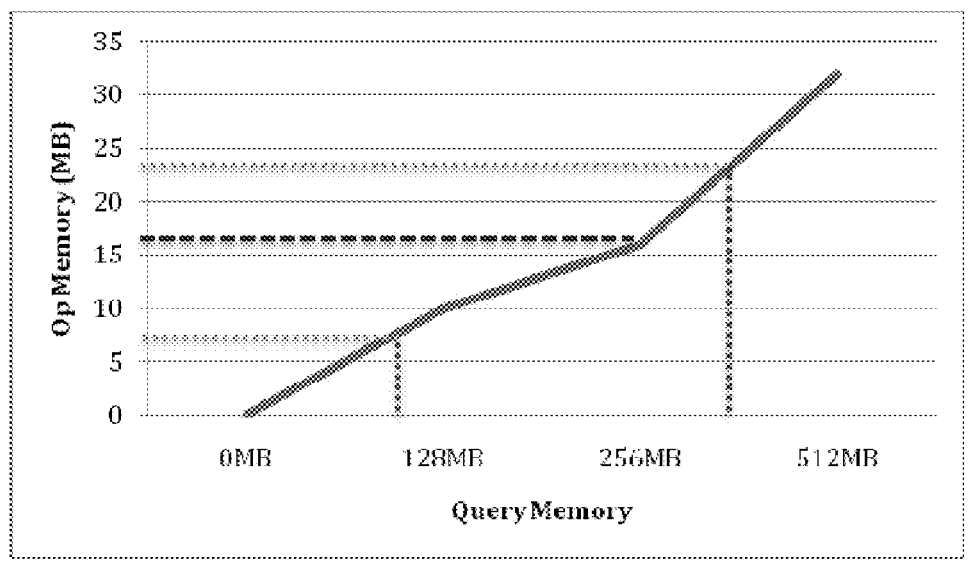
FIG. 3 is a graph of a method to compute memory intensive allocations in accordance with some embodiments.

FIG. 3 illustrates using the binary search algorithm in accordance with embodiments. The Y-axis measures the amount of memory (MB) the MI operator is allowed (Op Memory axis). The X-axis measures the amount of total memory (MB) the query is allowed (Query Memory). In terms of the above equations, the Y-axis measures MI and the X-axis measures X. As shown in FIG. 3, the MI operator requires roughly 15 MB in order to avoid spilling over to disk. Since the relationship between MI and X is non-linear, the binary search algorithm is used to determine the appropriate X value. A first try may be X=128 MB. This results in MI being allocated about 7 MB. This is less than the 15 MB required, so a higher value of X may be chosen. A second try may be X=300 MB. As shown in the graph, this results in MI being allocated about 24 MB. Although this would satisfy the MI operator, it may be undesirable to allocate too much memory to the MI operator. Since we now know 128 MB<X<300 MB, we can further narrow the range using the same process. For example, the third guess may be X=200, which would result in roughly MI=13. This is closer to the required MI value. The binary search algorithm may be considered complete if the MI value calculated is within a predefined tolerance range. For example, if a system can tolerate MI=15 MB+/−1 MB, then a MI value of 16 would be acceptable, even though 1 MB would be allocated and unused.

The value of X may be associated with a particular query. For example, X may be stored as part of a query plan's fingerprint, indicating that a query with a specific set and sequence of operators should be allocated this much memory. In some embodiments, the amount of memory allocated may be stored as part of the query's execution plan. Each operator in the execution plan may be associated with a memory allocation that the operator is allowed to use.

Figure 6:
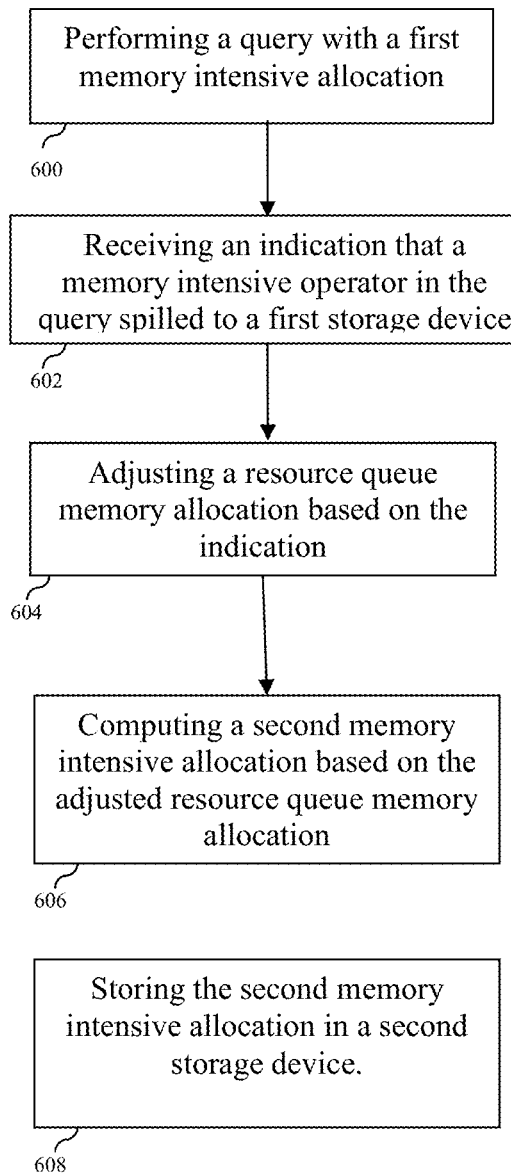
FIG. 6 is a flowchart of a method to process queries in accordance with some embodiments.

FIG. 6 illustrates a method to process queries in accordance with some embodiments. In step 600, a query is performed with a first intensive memory allocation. In step 602, an indication that a memory intensive operator in the query spilled to a first storage device is received. In step 604, a resource queue memory allocation is adjusted based on the indication. In step 606, a second memory intensive allocation is computed based on the adjusted resource queue memory allocation. In step 608, the second memory intensive allocation is stored in a second storage device.

Though FIG. 6 illustrates only one adjustment of the memory intensive allocation, multiple readjustments may take place. For example, in some embodiments where the binary search algorithm is used to recalculate the memory intensive allocation, multiple readjustments may take place. The binary search algorithm's first result may be too low, second result may be too high, third attempt may be too low, and so on. Depending on the tolerance of a system, multiple tries may be needed before an acceptable memory intensive allocation is computed. It is anticipated that a third, fourth, fifth, etc. memory intensive allocation may be computed based on many different resource queue memory allocations.

Further, though FIG. 6 illustrates an operator spilling to a first storage device, and the second memory intensive allocation in a second storage device, these two storage devices may be the same storage device. For example, a memory intensive operator may be spilled onto a hard disk, and the second memory intensive allocation calculated may be stored on the same hard disk.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for processing database queries in a database system, comprising:
    receiving a database query comprising a plurality of query operators;
    classifying each of the plurality of operators according to resource requirements for processing the operator;
    determining a query classification for the query based upon the resource requirements for processing the operators;
    assigning the query to a resource queue based on the determined query classification; and
    allocating resources to the assigned resource queue for processing of the query.

2. The method as recited in claim 1, wherein the resource queue is divided into a plurality of slots, each slot for a different query, and wherein said allocating comprises allocating sufficient resources for concurrently processing a plurality of different queries.

3. The method as recited in claim 2, wherein assigning the query to the assigned resource queue includes placing the query in a slot.

4. The method as recited in claim 1, wherein allocating resources comprises allocating memory to the assigned resource queue.

5. The method as recited in claim 4, wherein said allocating comprises dynamically allocating memory to the assigned resource queue as needed during processing of the query.

6. The method as recited in claim 1, wherein said classifying said operators comprises classifying operators as being memory intensive or non-memory intensive, and said determining further comprising determining a resource queue classification for the resource queue.

7. The method as recited in claim 1, wherein said allocating resources comprises allocating memory, and further comprising delaying the assignment of the query to the assigned resource queue if concurrent queries require more memory than the resource queue memory allocation minus a memory allocation for the query.

8. A system for processing database queries, comprising a processor, a memory, and resource queues for queries, the processor being configured to receive a query comprising a plurality of query operators, to assign the query to a resource queue based on the memory requirements of the plurality of query operators of the query, and to dynamically assign memory to the resource queue as required during processing of the query.

9. A computer program product for processing queries, comprising a non-transitory computer readable medium having program instructions embodied therein for controlling a machine for:
    receiving a database query comprising a plurality of query operators query;
    classifying each of the plurality of operators according to resource requirements for processing the operator;
    determining a query classification for the query based upon the resource requirements for processing the operators;
    assigning the query to a resource queue based on the determined query classification; and
    allocating resources to the assigned resource queue for processing of the query.

10. The computer program product of claim 9, wherein said classifying said operators comprises classifying the operators according to the memory requirements of the operators during processing, and said allocating resources comprises allocating memory to the assigned resource queue for processing said query.

11. The computer program product of claim 10, wherein said classifying said operators comprises classifying the operators as being memory intensive and non-memory intensive, and wherein said allocating memory comprises allocating a first amount of memory for the non-memory intensive operators of the query, and allocating a second amount of memory for the memory intensive operators determined as the difference between a total amount of memory allocated for the query and the first amount of memory, divided by the number of memory intensive operators in the query.

12. The computer program of claim 11, where said allocating said second amount of memory for memory intensive operators comprises dynamically adjusting the allocated second amount of memory as required during processing.

* * * * *